(12) United States Patent
Charton et al.

(10) Patent No.: US 11,636,536 B2
(45) Date of Patent: Apr. 25, 2023

(54) SYSTEMS AND METHODS FOR AUTOMATING PRICING DESK OPERATION

(71) Applicant: Banque Nationale du Canada, Montreal (CA)

(72) Inventors: Eric Charton, Montreal (CA); Yann-Edern L'Hour, Montreal (CA); Marie-Eve Malette, Montreal (CA); Julien Rizkallah-Leroux, Montreal (CA); Michel Descoteaux, Montreal (CA)

(73) Assignee: BANQUE NATIONALE DU CANADA, Montréal (CA)

( * ) Notice: Subject to any disclaimer, the term of this patent is extended or adjusted under 35 U.S.C. 154(b) by 0 days.

(21) Appl. No.: 17/443,159

(22) Filed: Jul. 21, 2021

(65) Prior Publication Data
US 2022/0027984 A1 Jan. 27, 2022

Related U.S. Application Data

(60) Provisional application No. 63/055,083, filed on Jul. 22, 2020.

(51) Int. Cl.
*G06Q 40/02* (2023.01)
*G06N 20/00* (2019.01)
*G06Q 30/02* (2023.01)
*G06Q 30/0201* (2023.01)

(52) U.S. Cl.
CPC ............. *G06Q 40/02* (2013.01); *G06N 20/00* (2019.01); *G06Q 30/0206* (2013.01)

(58) Field of Classification Search
CPC .... G06Q 40/02; G06Q 30/0206; G06N 20/00; G06N 5/003; G06N 20/20
USPC ......................................................... 705/35
See application file for complete search history.

(56) References Cited

U.S. PATENT DOCUMENTS

2020/0294133 A1* 9/2020 Cella .................... G06Q 40/025
2021/0201404 A1* 7/2021 Schwartz et al. ...... G06Q 40/02
2021/0398141 A1* 12/2021 Benkreira et al. ..... G06Q 30/00

OTHER PUBLICATIONS

Yinan Liu et al., Machine Learning in the Underwriting of Consumer Loans, CSP057, Mar. 2020, Harvard Law School, The Case Studies. (Year: 2020).*

(Continued)

*Primary Examiner* — Scott C Anderson
*Assistant Examiner* — George N. Proios
(74) *Attorney, Agent, or Firm* — Amster, Rothstein & Ebenstein LLP

(57) ABSTRACT

According to an aspect, a system for automating pricing desk operations is described. The system includes an input module configured to receive a proposed offer in relation to a financial product and associated context information; a machine learning module trained to classify offers according to positive or negative client; a processing module configured to optimize the proposed and an output module configured to transmit the optimized offer for communication to the client. According to additional aspects, a corresponding computer-implemented method, non-transitory computer-readable medium, and systems and methods for training a machine learning module are also described.

21 Claims, 4 Drawing Sheets

(56) References Cited

OTHER PUBLICATIONS

Young Jo et al., Data Point: 2019 Mortgage Market Activity and Trends, Jun. 2020, Consumer Financial Protection Bureau. (Year: 2020).*

Song et al., A review on the self and dual interactions between machine learning and optimisation, Apr. 25, 2019, Progress in Artificial Intelligence (2019) 8:143-165. (Year: 2019).*

* cited by examiner

SYSTEMS AND METHODS FOR AUTOMATING PRICING DESK OPERATION

RELATED APPLICATION

This application claims the benefit of and priority to U.S. Provisional Patent Application No. 63/055,083 filed Jul. 22, 2020 and entitled "SYSTEMS AND METHODS FOR AUTOMATING PRICING DESK OPERATIONS", the entirety of which is hereby incorporated by reference herein.

FIELD

The present invention relates to the field of machine learning, and more specifically to applying machine learning systems and methods to automate pricing desk operations.

BACKGROUND

When seeking to enter into an agreement for a financial product, such as a mortgage, a client can be presented an initial offer from a bank that includes a proposed interest rate. If the client refuses the proposed interest rate, a negotiation process can ensue between the client and the bank in an effort to settle on an interest rate that would be acceptable to both parties. This negotiation process can include a multitude of offers and counteroffers made by either party.

In such a scenario, final approval by the bank for any proposed offer or counteroffer can be handled by a centralized team of analysts, referred to as a "pricing desk". The pricing desk can have two main functions: (1) accepting or refusing a proposed offer (or counteroffer); and (2) if the offer is refused, proposing a new and final offer to present to the client.

As can be appreciated, depending on the size of the bank, a very large volume of pricing desk decisions may need to be handled on a regular basis. This places a heavy workload on pricing desk analysts, and throughput of pricing desk decisions can be limited by the number of analysts. Moreover, a human analyst can take up to two hours to render a pricing desk decision. This can lead to lost sales, as the client could visit competitors during the time it takes to finally approve an offer.

As can be further appreciated, a thorough analysis of proposed offers must be carried out in order to render a pricing desk decision. There is a wide range of digital information available to the bank that could assist in this analysis. However, the volume and format of this information creates a technical barrier such that much of this available information cannot be handled or meaningfully processed by human analysts. Current pricing desk decisions may therefore not be as optimal as they could be.

In view of the above, there is a need to automate at least some pricing desk operations, in order to overcome one or more limitations of existing systems. As can be appreciated, this presents significant technical challenges. The automated operations should perform at least as well or better than human analysists. However, replicating and automating human behaviour using machines is not an easy task. Therefore, specially adapted computer-implemented methods and systems are needed.

SUMMARY

According to an aspect, a system for automating pricing desk operations is provided. The system includes: an input module configured to receive a proposed offer to present to a client, and to receive input context information associated with the proposed offer, wherein the proposed offer comprises offer parameters in relation to a financial product; a machine learning module trained using historical offer data to classify offers according to positive or negative client decisions, based on offer parameters and historical context information associated with the offers; a processing module configured to optimize the proposed offer by performing the following subprocesses: generating a modified offer by altering the offer parameters of the proposed offer; processing the modified offer and the input context information using the machine learning module to determine an acceptance probability corresponding to a probability that the modified offer will result in a positive client decision; and repeating the subprocesses of generating the modified offer and processing the modified offer to obtain an optimized offer having optimized offer parameters and an acceptance probability above a predetermined threshold; and an output module configured to transmit the optimized offer for communication to the client.

According to an aspect, a computer-implemented method for automating pricing desk operations is provided. The method includes: receiving, via an input module, a proposed offer to present to a client, wherein the proposed offer comprises offer parameters in relation to a financial product; receiving, via the input module, input context information associated with the proposed offer; optimizing the proposed offer using a processing module and a machine learning module trained using historical offer data to classify offers according to positive or negative client decisions, based on historical offer parameters and historical context information associated with the historical offers, wherein the proposed offer is optimized by performing the following subprocesses: generating, via the processing module, a modified offer by altering the offer parameters of the proposed offer; processing the modified offer and the input context information using the machine learning module to determine an acceptance probability corresponding to a probability that the modified offer will result in a positive client decision; and repeating the subprocesses of generating the modified offer and processing the modified offer using the machine learning module to obtain an optimized offer having optimized offer parameters and an acceptance probability above a predetermined threshold; and transmitting the optimized offer for communication to the client.

According to an aspect, a non-transitory computer-readable medium is provided. The computer-readable medium has instructions stored thereon which, when executed by a processor, cause the processor to: receive a proposed offer to present to a client, wherein the proposed offer comprises offer parameters in relation to a financial product; receive input context information associated with the proposed offer; optimize the proposed offer using a machine learning module trained using historical offer data to classify offers according to positive or negative client decisions, based on historical offer parameters and historical context information associated with the historical offers, wherein the proposed offer is optimized by performing the following subprocesses: generating a modified offer by altering the offer parameters of the proposed offer; processing the modified offer and the input context information using the machine learning module to determine an acceptance probability corresponding to a probability that the modified offer will result in a positive client decision; and repeating the subprocesses of generating the modified offer and processing the modified offer using the machine learning module to obtain an optimized offer having optimized offer parameters and an acceptance probability above a predetermined threshold; and transmit the optimized offer for communication to the client.

According to an aspect, a method for training a machine learning model for automating pricing desk operations is provided. The method includes: receiving historical offers from a historical offer data source, said historical offers comprising offer parameters previously offered to clients in relation to a financial product; receiving historical context information associated with the historical offers from a historical context information data source; joining the historical offers with the associated historical context information to generate historical offer data; receiving historical client decisions associated with the historical offers from a historical client decisions data source; labeling the historical offer data according to a corresponding positive or negative client decision using the received historical client decisions; and training the machine learning model on a dataset comprising the labeled historical offer data, the machine learning model thereby being configured to classify proposed offers according to the positive or negative client decision based on input offer parameters and associated input context information.

DETAILED DESCRIPTION

In the following description, an "offer" will be described as a proposal that can be made in view of concluding an agreement between a client and a vendor in relation to a product. An offer comprises one or more offer parameters that can be negotiated between the client and vendor before coming to an agreement, such as a price of the product, or other terms/conditions attached to the product. In the following disclosure, offers will be described in connection with concluding an agreement for a financial product between a client and a bank (the vendor). It is appreciated, however, that the teachings can be applied to other types of products as well and are not necessarily limited to the field of financial services. Moreover, in the embodiments of the present disclosure, the optimizing of offers will be described by adjusting a loan interest rate for a mortgage. It is appreciated, however, that an offer can include one or more other offer parameters, such as a loan term, amortization period, loan type (ex: open vs. closed, fixed vs. variable), guarantee length, amount, fees, etc., which can also be adjusted in order to optimize the offer. Finally, although optimizing a mortgage loan will be described, it is appreciated that the same principles can apply to other types of financial products, such as a commercial loan, insurance or a saving deposit account, or to any other type of product that also have negotiable parameters.

Figure 1:
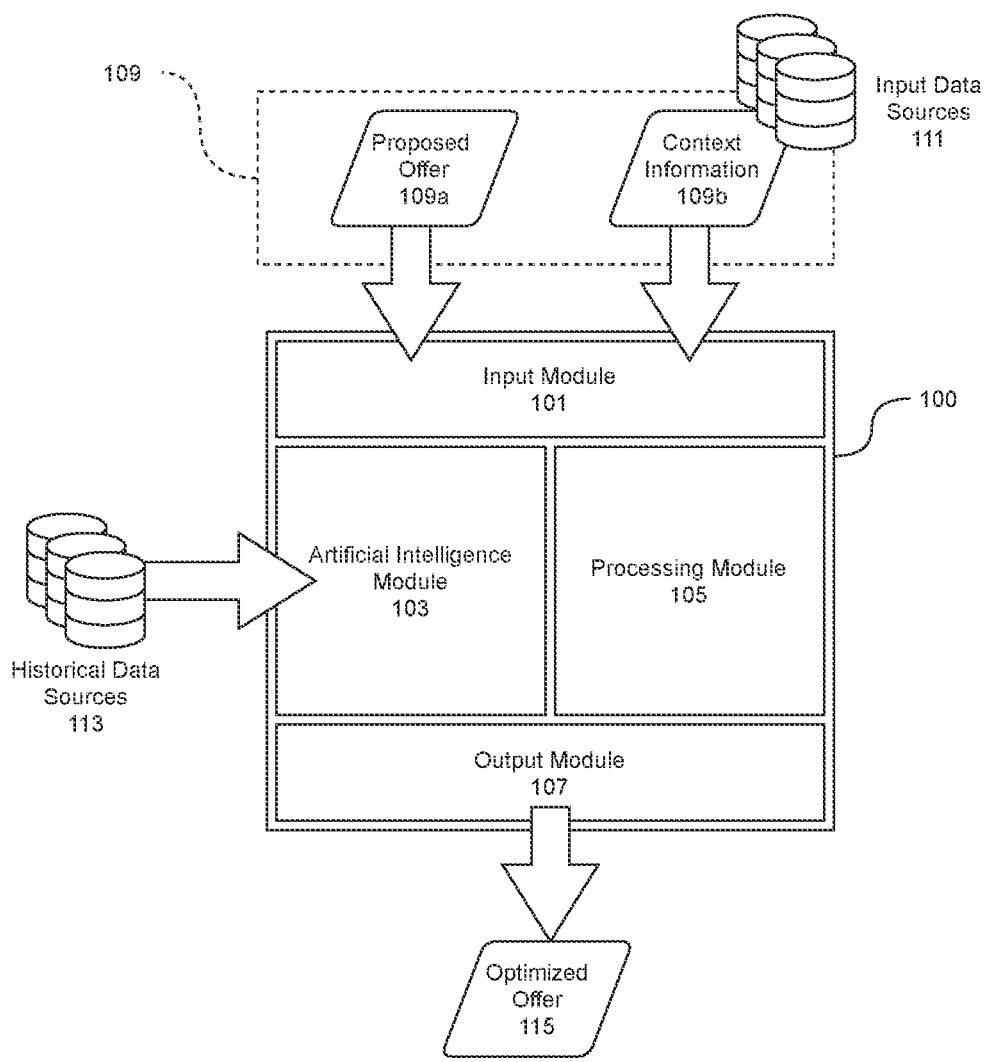
FIG. 1 is a schematic illustrating a system for automating pricing desk operations, according to an embodiment.

With reference to FIG. 1 a system 100 for automating pricing desk operations is shown according to an embodiment. In the illustrated embodiment, the system 100 comprises an input module 101, an artificial intelligence (AI) module 103, a processing module 105, and an output module 107. As can be appreciated, these modules can be implemented via programmable computer components, such as one or more physical or virtual computers comprising a processor and memory. It is appreciated, however, that other configurations are possible. Broadly described, the system 100 is configured to receive input offer data 109, and to automatically generate an optimized offer 115 as an output using AI module 103 and processing module 105.

The input module 101 is configured to receive input offer data 109 in the form of a proposed offer 109a and context information 109b associated with the proposed offer 109a. The proposed offer 109a comprises offer parameters, including a specified interest rate, and is "proposed" in the sense that it is a preliminary or draft offer that must be analyzed and/or revised prior to presenting to the client to ensure that the offer is optimal. The context information 109b comprises various ancillary information relating to the proposed offer 109a that may impact the client's decision to accept or decline an offer, and/or that may affect what parameters the client would consider acceptable (such as an acceptable interest rate, an acceptable cost of borrowing, an acceptable affordability, etc.).

In some embodiments, the context information 109b can comprise client-specific information. Client-specific information can correspond to information relating to the individual client to which the proposed offer 109a is directed. By way of example, client-specific information can include various information relating to the client's current behaviour, patterns, personal status, economic status, demographic segment, etc. such as financial transaction history, assets, account balances, credit score, website interaction data, social media interaction data, previous applications for financial products, home address, work address, occupation, title, professional affiliations, family and marital status, previous offers from competitors, cost to break an existing loan contract, among others.

The context information 109b can further include more general information that is not specific to the client but that may also impact the client's decision. For example, the context information 109b can include market-related information that can correspond to information relating to market condition in which the proposed offer 109a would be made. Such market-related information can include recently published competitor interest rates, current daily cost of funds, current pricing targets, among others. As another example, the context information 109b can include product-related information that can correspond to information relating to the specific financial product associated with the offer. Such product-related information can include characteristics of the financial product, such as the object of the loan (ex: whether or not the loan is to finance the purchase of a high-end or luxury asset), a classification of the product (ex: whether the financial product is marketed as premium or deluxe), etc. As can be appreciated, such information can be indicators of competitiveness in the market and may affect what the client would consider acceptable.

The input module 101 can be configured to receive the input offer data 109 in different formats. By way of example, some or all of the input offer data 109 can be received in the form of an e-mail or other plain-text format. In such embodiments, the input module 101 can be configured to clean and/or parse text data in the e-mail in order to extract the relevant offer parameters and/or context information. In other embodiments, data can be received using different mechanisms that may not require parsing and/or cleaning, such as via a form on a website or software application, or via an API. Once the input offer data 109 is received, the input module 101 can be configured to format the data such that it is in a form that is expected by other components in the system 100 and/or to validate the input offer data 109 to ensure that there are no errors and that no required data is missing.

The input module 101 can further be configured to receive the input offer data 109 from different sources. For example, the proposed offer 109a and corresponding offer parameters can be received in the form of an e-mail, while some or all of the context information 109b can reside on one or more external input data sources 111, such as databases, repositories, data stores, etc. Accordingly, the input module 101 can be configured to retrieve at least some context information 109b from the one or more external data sources 111, and to join the external context information 109b with the parameters of the proposed offer 109a to form the input offer data 109.

The AI module 103 is configured to simulate a client's behaviour in order to predict whether or not the client would accept a given offer. As will be described in more detail hereinafter, the results of this simulation can be used as part of a feedback loop to adjust the proposed offer 109a and automatically generate a corresponding optimized offer 115 therefrom. In the examples described herein, the AI module 103 utilizes machine learning techniques to learn and replicate client behaviour. It is appreciated, however, that other AI techniques are also possible.

In the present embodiment, the AI module 103 comprises a machine learning model stored on computer-readable memory, and trained using an algorithm to classify offer data according to a positive client decision (i.e. offer acceptance) or a negative client decision (i.e. offer refusal). In particular, the machine learning model takes offer parameters and context information as an input and provides a prediction as an output in the form of a binary client decision (i.e. acceptance or refusal). The output can also include a corresponding probability or confidence of the prediction (for example in the form of a % or other numeric value). Different classifier algorithms can be used for this purpose, such as logistic regression, random forest classifier, and gradient boosting classifier. It is appreciated, however, that other supervised machine learning algorithms are also possible.

In order to predict future client decisions, the AI module 103 can be trained using historical offer data. As can be appreciated, offers that were previously presented to clients can have corresponding offer data stored in one or more historical data sources 113, such as databases, repositories, data stores, etc. This historical offer data can include parameters of historical offers previously presented to clients, along with historical context information associated with the historical offers. The historical offer data can further include client decisions associated with the historical offers, thus providing an indication of whether the client actually accepted or refused the offer. The actual client decisions can be used to label the historical offer parameters and context information for the purposes of training a classifier algorithm. In this fashion, the AI module 103 can be configured to learn from the outcome of previous offers in order to predict client decisions for future offers. As can be appreciated, the AI module 103 can learn from historical offers that were generated by traditional methods (ex: generated manually by a human analyst) and/or offers that were generated/optimized by the present system 100. As can be further appreciated, the AI module 103 can be trained using the entirety of data available from historical data sources 113 or a subset thereof, such as historical offer data from a predetermined time period (ex: only data from 5 years in the past). The AI module 103 can be automatically retrained at regular intervals as needed to stay accurate/relevant and adapt to changing client behaviors, economic conditions, business rules or market competitivity.

The processing module 105 is configured to process the input offer data 109 and carry out an optimization process in order to generate an optimized offer 115 from the input offer data 109. An optimized offer 115 can correspond to a best possible offer that meets one or more predefined optimization criteria. For example, a best possible offer can correspond to an offer having maximized or minimized offer parameters while having a predicted client acceptance above a predetermined threshold. It is appreciated, however, that other factors can be taken into account when determining whether an offer is optimal, such as business factors including whether the offer has a calculated profitability above a predetermined threshold, whether the offer parameters are above or below predetermined thresholds, and whether criteria related to client economic welfare are optimized. For example, such criteria may assess the affordability of an offer for the client or the criteria may be related to specific needs of the client, for instance income or expenses that change over time. The criteria may also be related to the competitiveness of the offer with respect to other offers received by the client. In one embodiment, an optimized offer 115 corresponds to an offer having an interest rate that the client is likely to accept, and that has an interest rate above a predetermined threshold. In another embodiment the optimized offer 115 corresponds to an offer having an interest rate that the client is likely to accept and that is set such that a client's estimated cashflow over a certain time period does not decrease below a predetermined threshold. The cashflow may be estimated from a budget created by the client or the bank, or it may be estimated from current income and expenses of the clients, data which may be available on a bank's database of account transactions. In another example, the optimised offer 115 corresponds to an offer having an interest rate that the client is likely to accept and that is at least a certain amount lower than the next highest interest rate offered to the client by a competitor. The amount may, for example, be 0.05%, 0.1%, 0.15%, 0.2% and so on, up to 1%. In another embodiment, the optimized offer 115 corresponds to an offer having an interest rate set such that a hypothetical client, having expenses and income similar to that of the actual client, enjoys a cashflow over a certain time period that does not decrease below a predetermined threshold. The time period may be a period of months or years, and may correspond to the term of the loan. The threshold may be a dollar amount, such as $5000, or it may be a fraction of the income of the client, such as 10%. In another embodiment, the optimised offer 115 corresponds to an offer having an interest rate that the client is likely to accept and that ensures the interest and capital payments on the loan are never higher than a predetermined threshold. This threshold may be related to the estimated income of the client or hypothetical client, or to an anticipated expense of the client. For instance, the client knows she faces a significant medical expense in 9 months and the optimized offer 115 corresponds to an offer with an interest rate and an associated regular payment that enables the client to meet the anticipated expense. Finally, in another embodiment the optimized offer 115 corresponds to an offer having an interest rate that varies over the term of the loan, and that the client is likely to accept. The variation in the interest rate may be determined such that the client's payments are lower when the client's estimated cashflows are lower, and the interest rate is higher when the client's estimated cashflows are higher. These embodiments are examples of optimized offers 115 that optimize the financial health of the client. It is appreciated, however, that different optimization criteria are possible in other embodiments.

As can be appreciated, the proposed offer 109*a* may not correspond to an optimized offer if it does not meet the defined optimization criteria. Accordingly, the processing module 105 can be configured to carry out subprocesses to modify the proposed offer 109*a* as necessary to generate a more optimal offer therefrom and validate that it corresponds to an optimized offer 115. Such subprocesses can involve using different numerical methods to search for, identify and/or converge on an optimized offer 115, while applying the AI module 103 to predict offer acceptance probabilities. Such subprocesses can be carried out automatically with little to no human intervention, and can allow generating an optimized offer 115 quickly, thus allowing a large volume of proposed offers 109*a* to be optimized efficiently and in a cost-effective manner.

As can be appreciated, different processes can be carried out by processing module 105 in order to modify a proposed offer 109*a* and generate an optimized offer 115 therefrom. In an embodiment, the proposed offer 109*a* can be incrementally modified in order to eventually arrive at an optimized offer 115. For example, if the processing module 105 determines that the proposed offer 109*a* does not meet defined optimization criteria, the processing module 105 can modify the proposed offer 109*a* by incrementally adjusting one or more parameters of the proposed offer 109*a*. This can include, for example, incrementally increasing or decreasing the interest rate of the proposed offer 109*a* by a predetermined amount. The incremental adjustment can be a fixed amount (ex: a fixed numerical value, such as 0.1%), or a relative amount (ex: a fraction of the current interest rate, and/or a fraction of the last incremental change). Moreover, the modification can be based on which offer parameters needs to be optimized or improved. For example, if the processing module 105 determines that the interest rate of the proposed offer 109*a* is below a predetermined threshold, the offer can be modified to increase the interest rate. On the other hand, if the processing module 105 determines, using the AI module 103, that the client acceptance probability is below a predetermined threshold, the offer can be modified to decrease the interest rate.

The modified offer generated in this fashion can then be analyzed by the processing module 105 to determine if it is optimal. As described above, this can include processing the modified offer and the input context information 109*b* using the AI module 103 to predict a probability that the client would accept the modified offer, and determining whether the probability is above a predetermined threshold. This can further include processing the modified offer to determine whether the interest rate is above a predetermined threshold (and/or whether other optimization criteria are met). If the modified offer is not determined to be optimal, the modified offer can continue to be modified in the manner described above until an optimized offer is obtained.

In some embodiments, the proposed offer 109*a* can be modified iteratively or recursively in order to arrive at, or converge on, an optimized offer 115. As an example, upon receiving a proposed offer 109*a*, that offer can be assigned to a variable that can be referred to as a "current offer". The current offer can be analyzed along with input context information 109*b* using the AI module 103 to determine a client acceptance probability. The current offer can further be analyzed to calculate other optimization criteria. Next, the current offer can be fed into a recursive loop in which offer parameters of the current offer are incrementally adjusted in order to generate a modified offer. The modified offer can then be processed to calculate the client acceptance probability and other optimization criteria. Next, the offer parameters of the modified offer can be compared with the offer parameters of the current offer. If the offer parameters of the modified offer are superior to those of the current offer, and if the client acceptance probability of the modified offer is above a predefined threshold, the modified offer can be assigned as the current offer. The new current offer is then used as the input for the next iteration of the recursive loop. This loop can continue until the offer parameters of the modified offer are inferior to the current offer and/or until the client acceptance probability of the modified offer is below a predefined threshold, at which point the current offer is outputted as optimized offer 115. In other words, according to this process, the proposed offer 109*a* is iteratively modified such that it becomes more and more optimal each iteration. Once modifying the offer causes it to be less optimal, the last, most optimal modified offer is used as an output.

In an embodiment, the processing module 105 can be configured to generate a plurality of modified offers, and to search for the optimized offer 115 from among the plurality of modified offers. By way of example, upon receiving proposed offer 109*a*, the processing module 105 can generate a set of modified offers based on the proposed offer 109*a*. Such a set can, for example, comprise a range of offers having interest rates centered around the interest rate of the proposed offer 109*a*. For example, such a range can include a plurality offers at regular increments in a range of +/−0.10% around the interest rate of the proposed offer 109*a*, although it is appreciated that other distributions and ranges are also possible. Once the set of modified offers is generated, the processing module 105 can process at least some of the modified offers in the set, for example by calculating predicted acceptance probability using AI module 103 and calculating optimization criteria, to identify one of the modified offers that corresponds to the most optimal offer. The identified offer can then be output as the optimized offer 115. As can be appreciated, the processing module 105 can be configured to process each of the modified offers in the set, or to process a subset therefor, for example by applying searching algorithms to more efficiently identify the optimized offer. Moreover, in some embodiments, once the most optimal offer is identified, a new set of modified offers can be generated to determine if an even more optimal offer exists between the most optimal offer and a next closest offer.

Once an optimized offer 115 is generated by the processing module, it can be transmitted for communication to the client via the output module 107. As can be appreciated, the output module 107 can be configured to transmit the optimized offer 115 via different mechanisms, such as via an e-mail, via a user interface, via an electronic message to an external system, etc. It is further appreciated that the optimized offer 115 can be transmitted directly to the client, or via an intermediary, such as a bank agent or employee, who can then communicate the optimized offer 115 to the client.

Figure 2:
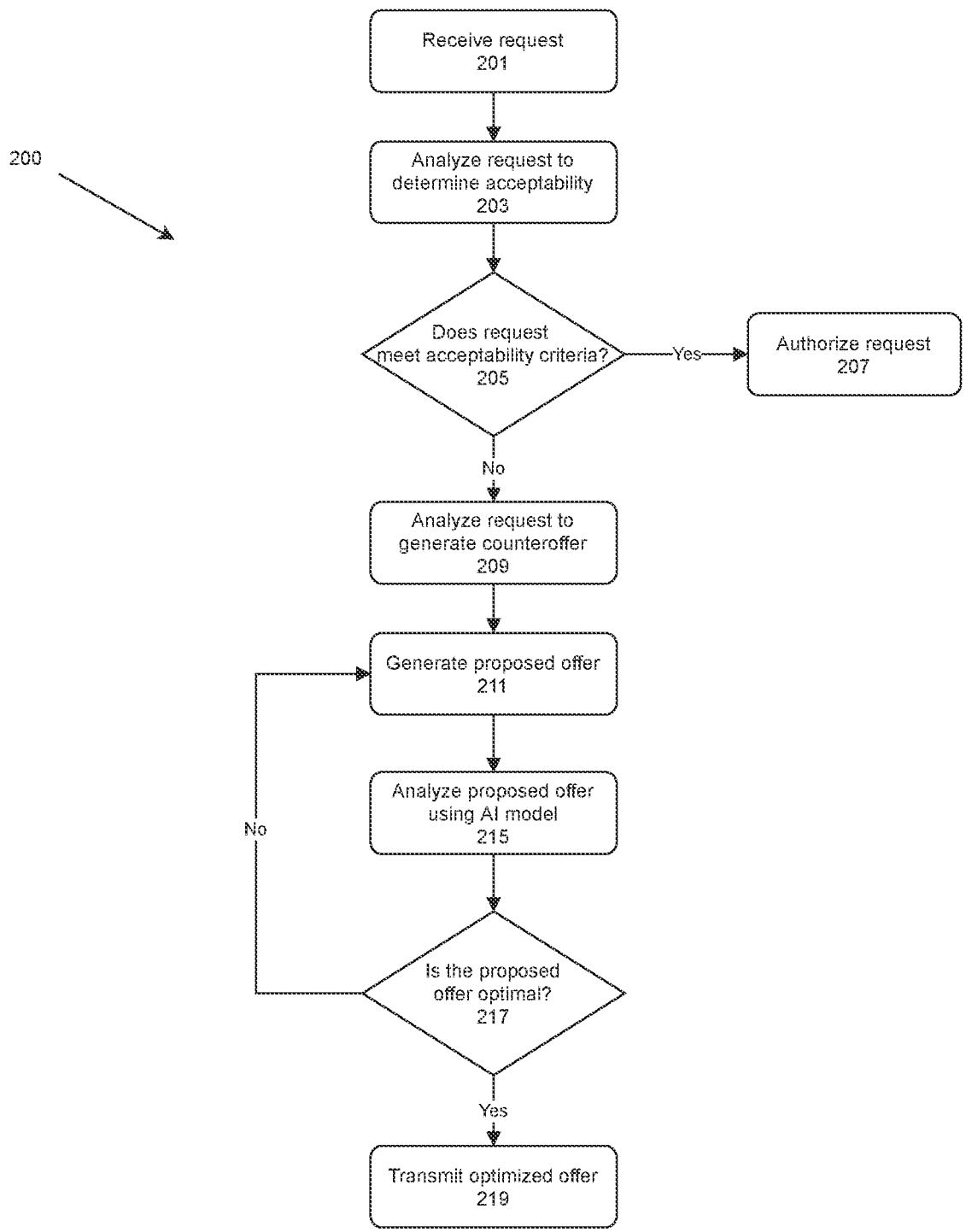
FIG. 2 is a flowchart illustrating a method for automating pricing desk operations, according to an embodiment.

The system 100 described above can be used as part of a broader negotiation process/system, such as a pricing desk, to automate a significant portion thereof and/or to allow for more favorable negotiation outcomes than would otherwise be possible. By way of example, and with further reference to FIG. 2, a pricing desk process 200 is shown according to an embodiment. In the present embodiment, the pricing desk is a last phase for a client during a mortgage rate negotiation. Before arriving at process 200, the client may have been offered one or more interest rates by bank employees without reaching an agreement. At this phase, the pricing desk serves to provide two functions: authorizing or refusing a mortgage rate proposed by the client and, if the proposal is refused, generating a new and final counteroffer to present to the client.

A first subprocess 201 comprises receiving a request for an interest rate decision. The request can be received by an employee or analyst tasked with making a final decision in response to a proposed offer. Such a request can be received, for example, via e-mail or other communication channel. The request can include an offer proposed by a client, including a proposed interest rate for a mortgage and other offer-related parameters, such as the mortgage term, type, etc. The request can further context information that can assist the analyst in making their decision.

A second subprocess 203 can comprise analyzing the request to determine whether it should be authorized or refused. Such an analysis can be conducted using the analyst's expertise, and can be based on a number of factors, such as the offer parameters of the proposed offer and context information associated with the proposed offer, including client-specific information, market-related information, etc. If the proposed offer meets acceptability criteria 205, the request can be authorized 207 by the analyst. Otherwise, the request will be refused.

In the event that the request is refused, a subsequent subprocess 209 can comprise analyzing the request in view of generating a counteroffer. Again, this can be conducted using the analyst's expertise, and can be based on a number of factors, including the proposed offer and context information associated with the proposed offer. Following a thorough analysis of the request, the analyst can generate a proposed offer 211 that can, for example, correspond to a minimum interest rate that the bank would be willing to offer the client.

In some embodiments, the process 200 can end at subprocess 211, and the generated offer would serve as a counteroffer that would be presented directly to the client. However, in the present embodiment, the proposed offer is provided as an input to system 100 in order to automatically generate an optimized offer therefrom. Accordingly, a subsequent subprocess 215 can comprise analyzing the proposed offer using the AI module 103 to determine whether the offer is optimal. For example, the AI module 103 can be used to predict whether the client acceptance probability is above a predefined threshold, and other parameters can be evaluated using the processing module 105 to validate that the offer meets one or more predefined optimization criteria.

If it is determined that the proposed offer is optimal 217, the optimized offer can be transmitted for communication to the client via output module 107. Otherwise, if the proposed offer is not optimal, an optimized offer can be generated via processing module 105. In the present embodiment, this comprises generating a new proposed offer 211 and analyzing the new proposed offer 215 to determine if it is optimal. This cycle can be repeated until the generated offer is optimal, at which point it can be transmitted for communication to the client 219.

As can be appreciated, offers optimized in this fashion can result in numerous advantages. By optimizing a proposed offer instead of immediately presenting proposed offers to clients, client acceptance can be increased, and profitability can be improved. For example, clients who would usually refuse a counteroffer could be offered a lower rate via an optimized offer, thus increasing the likelihood of coming to an agreement with a client who would otherwise have refused. As another example, bank profitability can be increased by offering a counteroffer with a higher interest rate while ensuring the client's economic welfare and still having an acceptable likelihood of coming to an agreement with the client. Moreover, utilizing the AI module 103 and processing module 105, a large volume of data from input and historical data sources 111, 113 can be leveraged in order to provide more accurate results, which would not otherwise be possible by a human agent.

As discussed above, the system 100 automates the process of optimizing offers, allowing for a large volume of proposed offers to be optimized, and allowing for individual offers to be optimized quickly and accurately without significantly increasing the overall time required for the pricing desk process 200. In order to further speed up the pricing desk process 200, the system 100 can be expanded to utilize additional AI models in order to automate other subprocesses that would normally need to be carried out by analysts. This can reduce or eliminate the workload on human analysts, allow for a large volume of requests to be handled, and allow for individual requests to be handled in minutes rather than hours. In this fashion, clients can get responses from the pricing desk quickly instead of going to the competition.

Figure 3:
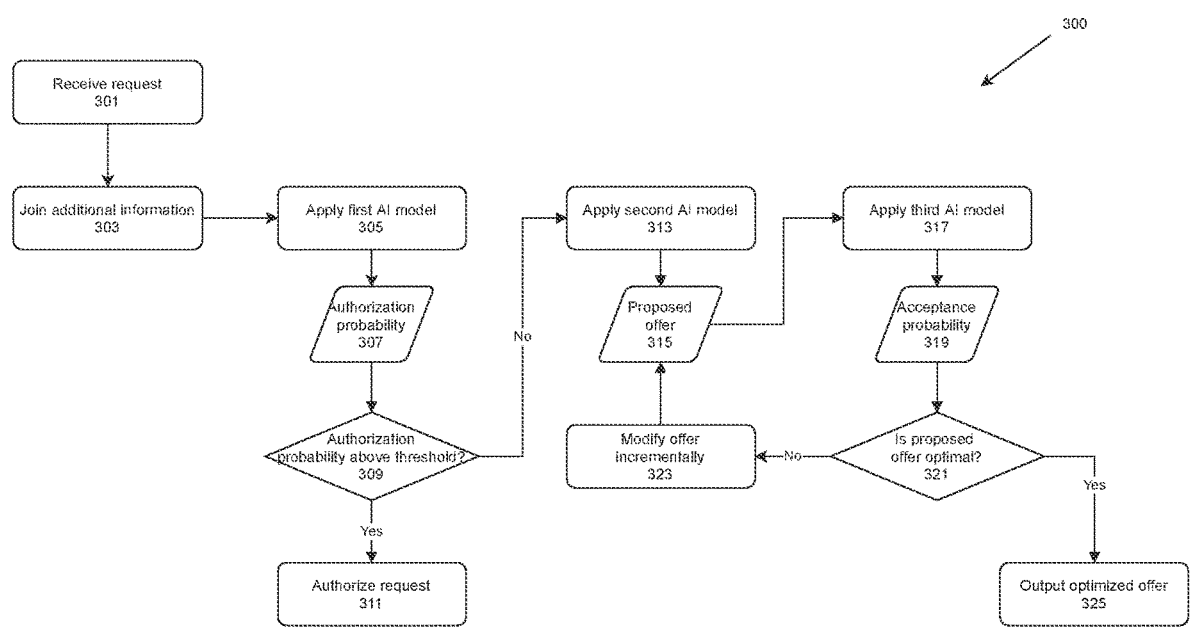
FIG. 3 is a flowchart illustrating a method for automating pricing desk operations, according to an embodiment using three AI models

With additional reference to FIG. 3, a substantially automated pricing desk process 300 carried out by system 100 is shown according to an embodiment. A first subprocess 301 comprises receiving a request for an interest rate decision. The request can be received, for example, via input module 101. The request can include an offer proposed by a client, including a proposed interest rate for a mortgage and other offer-related parameters, such as the mortgage term, type, etc. The request can further comprise context information associated with the proposed offer. In some embodiments, the request can be received via an API or other communication interface and include offer data and context information that is already in an expected format. However, it is appreciated that the request can also be received in other formats to facilitate interoperability, such as via an e-mail. In such a case, the first subprocess 301 can comprise parsing and cleaning the e-mail to extract the relevant offer data and context information.

A second subprocess 303 can comprise joining additional information. Although the request received in subprocess 301 can include some context information, additional information may be useful to construct a more complete picture of the offer context and/or to obtain more accurate results. Such additional context information may not be practical to include as part of the request (such as in an e-mail) and/or may only be accessible via external sources. Accordingly, subprocess 301 can comprise retrieving additional context information from external data sources 111, such as one or more databases. Such additional context information can include, for example, a current cost of funds, current competitor rates, current pricing targets, and/or other client-specific, market-related and/or product-related information. The combined data can subsequently be validated and formatted as required.

A subsequent subprocess 305 can comprise applying a first AI model to determine whether or not the offer proposed by the client should be authorized. This first AI model can be trained to predict the behavior of an analyst. Accordingly, the first model can be trained using historical offer data, historical context information, and corresponding historical analyst decisions in order to classify input offer data and context information according to a predicted binary analyst decision (i.e. authorization or refusal). In an embodiment, the first model can be trained using the gradient boosting technique, although it is appreciated that different techniques and different AI models are possible. As can be appreciated, the offer data and context information may need to be properly formatted in order to be processed by the first AI model. Accordingly, subprocess 305 can include scaling and encoding the offer data and context information, and generating a feature vector therefrom that can be used as an input to the first AI model.

In the present embodiment, the first AI model is configured to output an authorization probability 307 corresponding to a predicted confidence or probability that an analyst would authorize the offer proposed by the client. If the authorization probability is above a predetermined threshold 309, the request can be automatically accepted 311, for example by automatically sending a response via output module 107, through the same channel through which the request was received. If the authorization probability is below a predetermined threshold, subsequent subprocesses can be carried out in view of generating a counteroffer to present to the client.

More specifically, in the present embodiment, if the request is predicted to likely be rejected by an analyst, a second AI model is applied in subprocess 313 in order to generate a proposed counteroffer to present to the client. Again, this second AI model can be trained to predict the behavior of an analyst. Accordingly, the second AI model can be trained using historical offer data, historical context information, and corresponding historical counteroffers provided by analysts, in order to generate a probable counteroffer. In an embodiment, the second model can be trained using the Random Forest algorithm, although it is appreciated that other regression algorithms and/or other AI modelling techniques are also possible. As can be appreciated, the offer data and context information may need to be properly formatted in order to be processed by the second AI model. Accordingly, subprocess 313 can include scaling and encoding the offer data and context information, and generating a feature vector therefrom that can be used as an input to the second AI model.

In the present embodiment, the second AI model is configured to output a proposed offer 315, corresponding to a predicted counteroffer that an analyst would most likely provide in response to the initial offer requested by the client. This proposed offer 315 can subsequently be optimized via processing module 105. In the present embodiment, the proposed offer 315 is optimized via an iterative process that optimizes one or more offer parameters, while maintaining a predicted client acceptance probability above a predefined threshold.

More specifically, once an initial proposed offer 315 is generated, a subsequent subprocess 317 can comprise applying a third AI model to determine whether or not a client is likely to accept the proposed offer 315. The third AI model can be trained to predict the behavior of a client. Accordingly, the third model can be trained using historical offer data, including historical offer parameters and historical context information, and corresponding historical client decisions in order to classify input offer data (including input offer parameters and corresponding context information) according to a predicted binary client decision (i.e. acceptance or refusal). In an embodiment, the third model can be trained using a gradient boosting technique (such as via the XGBoost library), although it is appreciated that different techniques and different AI models are possible. As can be appreciated, the offer data may need to be properly formatted in order to be processed by the third AI model. Accordingly, subprocess 317 can include scaling and encoding the offer data, and generating a feature vector therefrom that can be used as an input to the third AI model.

The third AI model is configured to output an acceptance probability 319 corresponding to a predicted confidence or probability that the client would accept the proposed offer 315. In a subsequent subprocess, it can be determined whether the proposed offer 315 respects one or more optimization criteria and therefore corresponds to an optimized offer. For example, such optimization criteria can include a predicted acceptance probability 319 above a predetermined threshold, one or more offer parameters above a predetermined threshold, and an acceptance probability and/or offer parameters that are superior to any other analyzed offer. As an example, this can correspond to an offer adjusted to a client economic welfare, that the client is likely to accept.

If the optimization criteria are not met, the proposed offer 315 can be adjusted in an effort to approach an offer that is more optimal. For example, a subsequent subprocess 323 can comprise incrementally modifying the offer (for example by increasing or decreasing the offer interest rate by a defined amount) in order to generate a newly modified proposed offer 315. The new proposed offer 315 can be processed using the same subprocesses to apply the third model 317, generate an acceptance probability 319, and determine whether the offer is optimal 321. If the offer is not optimal, it can be modified again 323 and follow the same loop.

Otherwise, if the modified offer is determined to be optimal (for example if it is determined to be adjusted to a client economic welfare with a client acceptance above a predetermined threshold), the optimized offer can be output in subprocess 325. As can be appreciated, the optimized offer can be output automatically, for example by sending a response via output module 107 through the same channel through which the request was received. The optimized offer output in this fashion can subsequently be communicated to the client, either directly such as via a chatbot, or indirectly, such as via a bank agent.

Although in the above-described embodiment, a counteroffer is only attempted when the authorization probability calculated by the first model is below a predetermined threshold, it is appreciated that other configurations are possible. For example, in some embodiments, an optimized counteroffer can be generated regardless of the first model output. However, in such cases, the client acceptance probability for an optimized offer can be increased to a higher value than it would otherwise be. In this configuration, the counteroffer would only be presented to the client if there is a very high probability that the client would accept.

Figure 4:
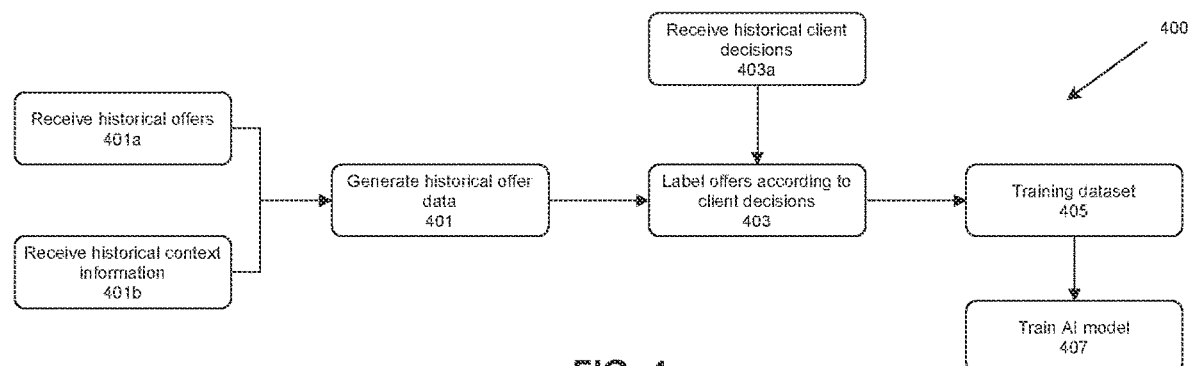
FIG. 4 is a flowchart illustrating a method for training an AI model for automating pricing desk operations, according to an embodiment.

As discussed above, in order to predict client behavior, the AI module 103 can be trained using historical data. In more detail now, and with further reference to FIG. 4, an exemplary process 400 for training AI module 103 is shown according to an embodiment.

A first subprocess can comprise generating historical offer data 401. In the present embodiment, historical offer data includes historical offers and historical context information associated with the historical offers. As can be appreciated, such information can be stored on one or more separate external data sources 113. Accordingly, subprocess 401 can comprise retrieving information from a plurality of external data sources 113 and combining the retrieved information to generate the historical offer data.

As an example, a first sub subprocess 401a can comprise receiving historical offers from a first historical data source. Such historical offers can include offers and/or counteroffers that were previously presented to clients, and that may have been presented to clients via different channels (such as automatically via system 100, or presented by bank agents). As can be appreciated, the historical offers can be stored in different formats, such as in plain text or e-mails that were previously transmitted to clients. In such cases, the e-mails can be parsed and cleaned in order to extract relevant information therefrom. This can include various offer parameters, such as the offered loan interest, loan term, loan type, etc.

A second sub subprocess 401b can comprise receiving historical context information. As can be appreciated, some context information can be received from the same data source as the historical offers. For example, historical offer e-mails can include some basic client-specific information. However, additional context information can be received from one or more second historical data sources. For example, client transactions and account balances can be retrieved from a first database, historical costs of funds can be retrieved from a second database, historical competitor rates can be retrieved from a third database, etc.

Once the historical offers and context information are received, they can be combined. As can be appreciated, this can comprise associating received context information with one or more received offers. As an example, if an offer was made to a client during a specific time period, context information from the same time period can be associated therewith. It is appreciated, however, that other techniques for associating offers with context information is also possible.

The associated historical offers and context information can further be combined and formatted into corresponding feature vectors. As an example, this can include scaling and encoding the historical offers and context information, and generating a feature vector for each historical offer. Each feature vector can encode the offer parameters of the historical offer, along with all relevant historical context information associated therewith.

Once the historical offer data has been generated, a subsequent subprocess 403 can comprise labelling the historical offer data in order to generate a training dataset 405. More specifically, in the present embodiment, each historical feature vector is labelled according to whether the client ultimately accepted the offer or refused the offer. As can be appreciated, this can include a sub subprocess 403a of receiving historical client decisions from a historical data source 113, and associating the client decisions with a corresponding historical offer. In some embodiments, the historical client decisions can be stored explicitly. For example, a database can be maintained that records historical offers that were presented to clients along with the client's decision. In other embodiments, the client decisions can be derived implicitly. For example, a database of historical financial products purchased by clients can be maintained. A positive client decision can be identified by correlating offer parameters of a historical product purchased by a client with a historical offer made to that client. A negative historical client decision can be identified by historical offers made to a client without a correlated historical purchased product.

The training dataset 405, which comprises a collection of labelled feature vectors, can subsequently be used in subprocess 407 as an input to train an AI model using a classification algorithm. By training the AI model in this fashion, the AI model can be configured to receive an input feature vector comprising a proposed offer and corresponding context information, and classify the feature vector according to a positive or negative client decision. The AI model can further output a confidence or probability of the classification.

As can be appreciated, client behaviours and trends can change over time. This can result in a trained AI model becoming less accurate over time and/or result in the degradation of offer optimization. Accordingly, the AI model and/or optimization process can be regularly updated over time in order to improved prediction accuracy and/or in order to improve optimization results. In some embodiments, the updating can be done in an ongoing fashion, for example by configuring the AI model to continually learn from new historical offer data as it becomes available in order to strengthen the model. In some embodiments, the updating can be done 3o at regular intervals, for example at scheduled maintenance periods, and/or automatically when the prediction accuracy and/or optimization results degrade past a predetermined threshold. In some embodiments, updating the model can comprise retraining the model from scratch, for example such that only historical data from a certain period is taken into account (ex: only data from the past 5 years). It is appreciated, however, that different updating and/or retraining strategies are possible.

Figure 5:
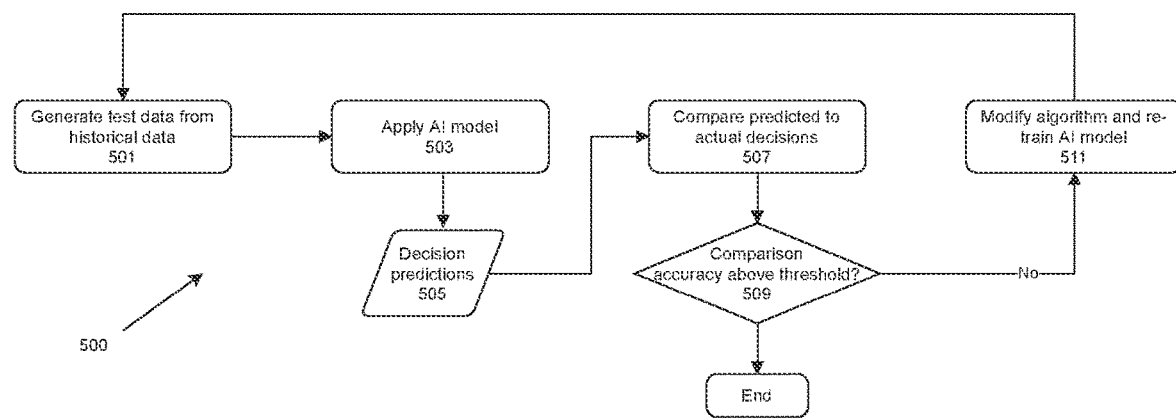
FIG. 5 is a flowchart illustrating a method for validating and retraining an AI model for automating pricing desk operations, according to an embodiment.

With reference to FIG. 5, an exemplary process 500 for updating an AI model is shown according to an embodiment. In the present embodiment, the model that is updated corresponds to an AI model for predicting client behavior (i.e. classifying input offer data according to a positive or negative client decision). It is appreciated, however, that similar techniques can apply to other AI models described herein.

A first subprocess 501 can comprise generating test data. This test data can correspond to historical offer data, and can include feature vectors created from historical offers and corresponding context information. Preferably, the test data comprises historical offer data that was created after the AI model was trained (i.e. recent historical data that was not used to train the AI model). It is appreciated, however, that other data can be used as well. For example, in some embodiments, at least some of the test data can be simulated data.

In a subsequent subprocess 503, the AI model can be applied to the test data in order to generate client decision predictions 505 therefrom. The decision predictions 505 generated by the AI model can then be compared to actual client decisions 507. In other words, the predictions of the AI model can be compared to what clients actually decided in the real world in order to evaluate an accuracy of the AI model. If the AI model is sufficiently accurate, for example if the proportion of accurate vs. inaccurate predictions is above a predefined threshold 509, the AI model will not need to be updated. Otherwise, if the accurate vs. inaccurate predictions is below a predefined threshold 509, the AI model can be automatically updated and/or retrained 511, before returning to subprocess 501 to re-test and validate the updated/retrained model.

In the illustrated embodiment, the subprocess of updating the AI model 511 comprises modifying at least one parameter of the AI model and/or classification algorithm. For example, if it is determined that the AI model is not sufficiently accurate, thresholds of the machine learning algorithm can be adjusted in order to optimize an F-score of the model. As another example, if the AI model is determined to no longer be sufficiently accurate, a different machine learning algorithm can be used to train the AI model. For example, the process can involve automatically testing a set of one or more predefined machine learning algorithms to identify the algorithm that provides the most accurate/desirable results. Such algorithms can include, for example logistic regression, random forest classifier, and gradient boosting classifier, among others.

Finally, although process 500 was described in connection with updating an AI model, it is appreciated that a similar process can be applied for automatically updating the optimization process carried out by the processing module 105 of the system 100 of FIG. 1. For example, optimized offers generated via processing module 105 can be automatically compared with test offers corresponding to unoptimized offers, in order to determine whether the optimized offers provide better results. This can include comparing parameters such as profitability and/or client welfare, and determining whether a proportion of optimized offers providing better results than test offers is above a predefined threshold. As another example, the test offers can comprise simulated offers that are generated in a predetermined range around the optimized offer.

In these examples, if the proportion of optimized offers providing better results than test offers is below the predefined threshold, the optimization process can be automatically adjusted, for example by modifying thresholds or relative weights of the optimization parameters. The optimization process can subsequently be re-tested and validated to confirm that it performs as expected and/or to determine whether further modifications are needed.

Although particular advantages and applications of the invention have been explicitly described herein, other advantages and applications may become apparent to a person skilled in the art when reading the present disclosure. The invention is not limited to the embodiments and applications described, and one skilled in the art will understand that numerous modifications can be made without departing from the scope of the invention.

The invention claimed is:

1. A system for automating pricing desk operations, comprising:
   at least one processor; and
   memory, the memory having stored thereon:
      a first machine learning model trained, using historical initial offer data and corresponding historical counteroffers provided by analysts, to generate proposed counteroffers based on first offer parameters associated with initial offers and first context information associated with the initial offers, wherein the historical initial offer data and the first context information comprise market-related information comprising at least one of: published competitor interest rates, daily costs of funds, and pricing targets;
      a second machine learning model trained using historical offer data and corresponding historical client decisions to classify offers according to positive or negative client decisions, based on second offer parameters associated with the offers and historical second context information associated with the offers, wherein the historical offer data and the second context information comprise market-related information comprising at least one of: published competitor interest rates, daily costs of funds, and pricing targets; and
      computer-executable instructions which, when executed by the at least one processor, cause the at least one processor to:
         receive an initial offer requested by a client, and receive input context information associated with the initial offer, wherein the initial offer comprises first offer parameters in relation to a financial product;
         process the initial offer and the input context information using the first machine learning model to generate a proposed counteroffer comprising counteroffer parameters in relation to the financial product;
         process the proposed counteroffer and the input context information using the second machine learning model to determine a first acceptance probability corresponding to a probability that the proposed counteroffer will result in a positive client decision;
         when the first acceptance probability is above a predetermined threshold, transmit the proposed counteroffer for communication to the client; and
         when the first acceptance probability is below the predetermined threshold, optimize the proposed counteroffer by:
            generating a modified offer by altering the counteroffer parameters of the proposed counteroffer;
            processing the modified offer and the input context information using the second machine learning model to determine a second acceptance probability corresponding to a probability that the modified offer will result in a positive client decision;
            repeating the generating of the modified offer and the processing of the modified offer until the second acceptance probability is above the predetermined threshold; and
            transmitting the modified offer for communication to the client when the second acceptance probability is above the predetermined threshold.

2. The system according to claim 1, wherein the proposed counteroffer is optimized by searching for an optimal offer from a generated set of modified offers, the generating of the modified offer and the processing of the modified offer comprising:
   i) generating the set of modified offers, the set of modified offers corresponding to a range centered around the proposed counteroffer;
   ii) processing at least some of the modified offers in the set along with the input context information using the second machine learning model to determine, for each respective modified offer of the at least some of the modified offers, a respective second acceptance probability corresponding to a respective probability that the respective modified offer will result in a positive client decision; and
   iii) identifying one of the respective modified offers having optimized offer parameters among the set of modified offers and respective second acceptance probability above the predetermined threshold, the identified one of the respective modified offers being transmitted for communication to the client.

3. The system according to claim 1, wherein the proposed counteroffer is optimized by iteratively modifying the proposed counteroffer, generating of the modified offer and the processing of the modified offer comprising:
   i) assigning the proposed counteroffer to a current offer;
   ii) generating the modified offer by incrementally adjusting parameters of the current offer;
   iii) processing the modified offer and the input context information using the second machine learning model to obtain the second acceptance probability of the modified offer;
   iv) when the second acceptance probability of the modified offer is above the predetermined threshold and the parameters of the modified offer are superior to the current offer, assigning the modified offer as the current offer and returning to subprocess ii); and
   v) transmitting the current offer for communication to the client when the current offer cannot be further modified to have superior parameters while keeping the second acceptance probability above the predetermined threshold.

4. The system according to claim 1, wherein the first offer parameters, second offer parameters and counteroffer parameters comprise an interest rate.

5. The system according to claim 1, wherein the financial product is a mortgage.

6. The system according to claim 1, wherein the historical initial offer data, the historical offer data, the first context information, the second context information and the input context information comprise client-specific information.

7. The system according to claim 6, wherein the client-specific information comprises at least one of: financial transaction history, account balances, credit score, website interaction data, social media interaction data, previous applications for financial products, home address, work address, family and marital status, previous offers from competitors, and cost to break existing contract.

8. The system according to claim 1, wherein the historical initial offer data, the historical offer data, the first context information, the second context information and the input context information comprise product-related information, said product-related information corresponding to characteristics of a type of the financial product to which the offers relate.

9. The system according to claim 1, wherein the second machine learning model is trained using the historical offer data comprising feature vectors of the second offer parameters and second context information, each feature vector labeled as a positive or negative client decision.

10. The system according to claim 1, wherein the second machine learning model is retrained using the historical offer data at regular predetermined intervals.

11. The system according to claim 1, wherein the second machine learning model is trained using historical offer data from within a predetermined time period.

12. The system according to claim 1, wherein the second machine learning model is configured to process offers using a trained classification algorithm.

13. The system according to claim 12, wherein the trained classification algorithm is selected from a group consisting of: logistic regression, random forest classifier, and gradient boosting classifier.

14. The system according to claim 1, wherein at least some of the historical initial offer data, the historical offer data, the first context information, the second context information, or the input context information is received from at least one external database.

15. The system according to claim 14, wherein the at least one external database comprises: a database of historical pricing desk offers, a database of historically accepted offer parameters, a database of client information, a database of historical rates offered by competitors, and a database of historical cost structures used to calculate offer parameters.

16. The system according to claim 1, wherein the computer-executable instructions cause the at least one processor to preprocess the initial offer and input context information before they are provided to the first machine learning model.

17. The system according to claim 16, wherein the preprocessing comprises at least one of: parsing and cleaning, joining additional information, formatting and validating, and scaling and encoding.

18. The system according to claim 1, wherein the computer-executable instructions cause the at least one processor to:
   receive the initial offer comprising requested parameters in relation to a financial product;
   determine whether to authorize or refuse the initial offer based on predetermined criteria; and
   when the initial offer is refused, initiating the generating of the proposed counteroffer.

19. The system according to claim 18, wherein:
   when the initial offer is refused, the proposed counteroffer is generated by generating an optimized offer having the first or second acceptance probability above a first predetermined threshold; and
   when the initial offer is accepted, the proposed counteroffer is generated by generating an optimized offer having the first or second acceptance probability above a second predetermined threshold that is greater than the first predetermined threshold.

20. A computer-implemented method for automating pricing desk operations, comprising:
   receiving, by at least one processor, an initial offer requested by a client, wherein the initial offer comprises offer parameters in relation to a financial product;
   receiving, by the at least one processor, input context information associated with the initial offer;
   processing, via the at least one processor, the initial offer and the input context information using a machine learning model to generate a proposed counteroffer, the first machine learning model being trained, using historical offer data and corresponding historical counteroffers provided by analysts, to generate proposed counteroffers based on offer parameters associated with the initial offers and context information associated with the initial offers;
   processing, via the at least one processor, the proposed counteroffer and the input context information using a second machine learning model to determine an acceptance probability corresponding to a probability that the proposed counteroffer will result in a positive client decision, second machine learning model being trained, using historical offer data and corresponding historical client decisions, to classify offers according to positive or negative client decisions based on historical offer parameters associated with the offers and historical context information associated with the historical offers;

when the acceptance probability of the proposed counteroffer is above a predetermined threshold, transmitting the proposed counteroffer for communication to the client; and when the acceptance probability of the proposed counteroffer is below the predetermined threshold, optimizing the proposed counteroffer by:

generating, via the at least one processor, a modified offer by altering the offer parameters of the proposed counteroffer;

processing, via the at least one processor, the modified offer and the input context information using the second machine learning model to determine a modified acceptance probability corresponding to a probability that the modified offer will result in a positive client decision; and repeating the generating of the modified offer and the processing of the modified offer using the machine learning module to obtain an optimized offer having optimized offer parameters and an until the modified acceptance probability of the modified offer is above the predetermined threshold; and transmitting the modified offer for communication to the client.

21. A non-transitory computer-readable medium having instructions stored thereon which, when executed by at least one processor, cause the at least one processor to:

receive an initial offer requested by a client, wherein the initial offer comprises offer parameters in relation to a financial product;

receive input context information associated with the initial offer;

process the initial offer and the input context information using a first machine learning model to generate a proposed counteroffer, the first machine learning model being trained, using historical offer data and corresponding historical counteroffers provided by analysts, to generate proposed counteroffers based on offer parameters associated with the historical initial offers and context information associated with the historical initial offers;

process the proposed counteroffer and the input context information using a second machine learning model to determine an acceptance probability corresponding to a probability that the proposed counteroffer will result in a positive client decision, the second machine learning module model being trained, using the historical offer data and corresponding historical client decisions, to classify offers according to positive or negative client decisions based on historical offer parameters associated with the offers and historical context information associated with the offers, when the acceptance probability of the proposed counteroffer is above a predetermined threshold, transmit the proposed counteroffer for communication to the client; and when the acceptance probability of the proposed counteroffer is below a predetermined threshold, optimize the proposed counteroffer by:

generating a modified offer by altering the offer parameters of the proposed counteroffer;

processing the modified offer and the input context information using the second machine learning model to determine a modified acceptance probability corresponding to a probability that the modified offer will result in a positive client decision; and repeating the generating of the modified offer and the processing of the modified offer until the modified acceptance probability of the modified offer is above the predetermined threshold; and transmit the modified offer for communication to the client.

* * * * *

UNITED STATES PATENT AND TRADEMARK OFFICE
CERTIFICATE OF CORRECTION

PATENT NO. : 11,636,536 B2
APPLICATION NO. : 17/443159
DATED : April 25, 2023
INVENTOR(S) : Eric Charton et al.

It is certified that error appears in the above-identified patent and that said Letters Patent is hereby corrected as shown below:

In the Claims

Column 16 Line 4-6, Claim 1, please replace "offers, wherein the historical offer data and the second context information comprise market-related information comprising at least one of: published..." with: -- offers, wherein the historical offer data and the historical second context information comprise market-related information comprising at least one of: published..." --

Column 17 Line 27-29, Claim 4, please replace "The system according to claim 1, wherein the first offer parameters, second offer parameters and counteroffer parameters comprise an interest rate." with: -- The system according to claim 1, wherein the first offer parameters, the second offer parameters and the counteroffer parameters comprise an interest rate. --

Column 18 Line 61-62, Claim 20, please replace "...decision, second machine learning model being trained, using historical offer data and corresponding historical..." with: -- ... decision, second machine learning model being trained, using the historical offer data and corresponding historical... --

Column 18 Line 66-67, Claim 20, please replace "...context information associated with the historical offers;" with: -- ...context information associated with historical offers; --

Column 20 Line 2-4, Claim 21, please replace "...parameters associated with the historical initial offers and context information associated with the historical initial offers;" with: -- ...parameters associated with the historical initial offers and context information associated with historical initial offers; --

Column 20 Line 9-10, Claim 21, please replace "...a positive client decision, the second machine learning model being trained, using the historical offer..." with: -- ...a positive client decision, the second machine learning module model being trained, using the historical offer... --

Column 20 Line 21-23, Claim 21, please replace "when the acceptance probability of the proposed counteroffer is below a predetermined threshold, optimize the proposed counteroffer by:" with:

Signed and Sealed this
Ninth Day of January, 2024

Katherine Kelly Vidal
*Director of the United States Patent and Trademark Office*

CERTIFICATE OF CORRECTION (continued)
U.S. Pat. No. 11,636,536 B2

-- when the acceptance probability of the proposed counteroffer is below the predetermined threshold, optimize the proposed counteroffer by: --